US008320832B2

(12) United States Patent
Kang et al.

(10) Patent No.: US 8,320,832 B2

(45) Date of Patent: Nov. 27, 2012

(54) WIRELESS AUDIO OUTPUT DEVICE, WIRELESS AUDIO OUTPUT SYSTEM INCLUDING THE SAME AND CONTROL METHOD THEREOF

(75) Inventors: Il Dong Kang, Suwon-si (KR); Oguro Masaki, Suwon-si (KR); Hosaka Akihiko, Suwon-si (KR); Young Gyoo Choi, Yongin-si (KR); Jung Hun Kwak, Yongin-si (KR); Sang Geun Kim, Paldal-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 12/210,423

(22) Filed: Sep. 15, 2008

(65) Prior Publication Data

US 2009/0222116 A1 Sep. 3, 2009

(30) Foreign Application Priority Data

Mar. 3, 2008 (KR) ........................ 10-2008-0019659

(51) Int. Cl.
*H04B 7/00* (2006.01)

(52) U.S. Cl. ..................... 455/41.3; 455/3.01; 455/3.06; 700/94

(58) Field of Classification Search ................. 455/3.01, 455/3.06, 41.3, 66.1, 344
See application file for complete search history.

(56) References Cited

U.S. PATENT DOCUMENTS

| | | | | |
|---|---|---|---|---|
| 7,383,031 | B2 * | 6/2008 | Sasaki | 455/131 |
| 7,689,253 | B2 * | 3/2010 | Basir | 455/563 |
| 2007/0222771 | A1 * | 9/2007 | Brask et al. | 345/204 |
| 2008/0163302 | A1 * | 7/2008 | Khedouri et al. | 725/46 |
| 2008/0215209 | A1 * | 9/2008 | Ikeda et al. | 701/36 |

FOREIGN PATENT DOCUMENTS

KR 2006-23923 3/2006

* cited by examiner

*Primary Examiner* — Tuan H Nguyen

(74) *Attorney, Agent, or Firm* — Jefferson IP Law, LLP

(57) ABSTRACT

A wireless audio output device, a wireless audio output system including the same and a control method thereof are disclosed. When a user approaches the output device, while listening to music on a portable device, the output device automatically connects the wireless audio output system to the portable device, to reproduce the music of the portable device. The control method includes detecting the user, detecting the portable device if the user is sensed, and outputting an audio file being reproduced by the portable device using the wireless audio output system, if the portable device is detected.

16 Claims, 2 Drawing Sheets

WIRELESS AUDIO OUTPUT DEVICE, WIRELESS AUDIO OUTPUT SYSTEM INCLUDING THE SAME AND CONTROL METHOD THEREOF

CROSS-REFERENCE TO RELATED APPLICATION

This application claims the benefit of Korean Patent Application No. 2008-19659, filed on Mar. 3, 2008 in the Korean Intellectual Property Office, the disclosure of which is incorporated herein by reference.

BACKGROUND OF THE INVENTION

1. Field of the Invention

Aspects of the present invention relate to a wireless audio output device, a wireless audio output system including the same, and a control method thereof.

2. Description of the Related Art

With the advance of digital technologies and mobile communication technologies, the number of portable devices, such as mobile phones, notebook computers, and MP3 players, is increasing. Such a portable device can be configured to store a music file and reproduce the stored music file for a user, so that the user of the portable device can appreciate music while carrying the portable device. However, the user may want to listen to the music file through a high-power receiver, or powered speaker, provided in his/her home or office. Therefore, there is an increasing need for a receiver/speaker to easily receive and output the music file stored in the portable device.

In order to meet the user's desire and need, Bluetooth modules, or infrared transmission and reception modules, are installed in the portable device and the speaker, respectively. A connection (communication authentication) is performed between the two devices, and various files, such as MP3 files, are wirelessly transmitted and received between the two devices, so that the user can listen to music stored in the portable device, through the speaker, within a local area.

However, in order to output music being reproduced by the portable device to the speaker, the user has to manually connect the same, frequently operates buttons of the portable device, resulting in inconvenience in using Bluetooth. Further, when the user operates a button of the portable device for the connection, the music being reproduced by the portable device is discontinued. As a result, the user has to interrupt the music.

SUMMARY OF THE INVENTION

Therefore, it is an aspect of the invention to provide a wireless audio output device, which is capable of automatically connecting to a portable device, to reproduce music stored on the portable device, when a user approaches the output device, while listening to music using the portable device. Also provided are a wireless audio output system, including the wireless audio output device, and a control method thereof.

It is another aspect of the invention to provide a wireless audio output device, which is capable of automatically lowering the volume of the output device, to notify a user that an incoming call has been made to a portable device, while the user listens to music of the portable device.

In accordance with one aspect of the invention, there is provided a control method of a wireless audio output device, comprising: determining whether a user is detected; searching for a portable device if the user is detected; and outputting an audio file being reproduced by the portable device, if the portable device is detected by the search.

According to aspects of the present invention, the searching may comprise: outputting a request signal to search for the portable device; and if a response signal corresponding to the request signal is transmitted from the portable device, comparing identification information included in the response signal with identification information of the portable device, which is pre-stored in the wireless audio output device.

According to aspects of the present invention, the control method may further comprise determining whether an audio file is received through any one of a plurality of external connection terminals, if the portable device is not detected.

According to aspects of the present invention, the control method may further comprise, if an audio file is received through any one of the external connection terminals, outputting the received audio file. Alternatively, the control method may further comprise, if no audio file is received through any of the external connection terminals, searching for a particular one of the external connection terminals that most recently received an audio file, and waiting for an audio file to be received through the particular external connection terminal.

According to aspects of the present invention, the control method may further comprise driving light-emitting diodes (LEDs) to emit alpha waves, when the audio file is outputted.

According to aspects of the present invention, the control method may further comprise: determining whether an incoming call is made to the portable device; and if the incoming call is made, lowering the volume of speakers, to notify the user of the incoming call.

According to aspects of the present invention, the control method may further comprise, if a command to control the audio file is transmitted from a remote controller, which wirelessly controls the wireless audio output device, delivering the audio file control command to the portable device, to control the output of the audio file. The controlling the output of the audio file may comprise fast forwarding, pausing, stopping, or rewinding the audio file.

In accordance with another aspect of the invention, there is provided a wireless audio output device comprising: a user sensor to detect a user; a wireless communication unit to search for a portable device, if the user is detected; and a controller to control the output an audio file being reproduced by the portable device, if the portable device is detected by the search. The controller may output a request signal to search for the portable device. If a response signal corresponding to the request signal is transmitted from the portable device, the controller compares identification information included in the response signal with identification information of the portable device, which is pre-stored in the wireless audio output device, to determine whether the portable device is connectable to the wireless audio output device.

According to aspects of the present invention, the controller may determine whether an audio file is received through any one of a plurality of external connection terminals, if the portable device is not detected.

According to aspects of the present invention, if an audio file is received through any one of the external connection terminals, the controller may control the output of the received audio file. Alternatively, if no audio file is received through any of the external connection terminals, the controller may search for one of the external connection terminals through which a latest audio file was received, and then wait for an audio file to be received through the searched external connection terminal.

According to aspects of the present invention, the controller may drive LEDs to emit alpha waves, when the audio file is outputted.

According to aspects of the present invention, the portable device may comprise a telephone circuit to receive an incoming call signal transmitted from a mobile communication base station. If the incoming call signal from the mobile communication base station is received by the telephone circuit, the controller may lower a volume of speakers, to notify the user of the incoming call.

In accordance with a further aspect of the invention, there is provided a wireless audio output system comprising: a portable device to reproduce an audio file; and a wireless audio output device to search for the portable device, if a user is sensed, and output the audio file being reproduced by the portable device, if the portable device is detected by the search.

According to aspects of the present invention, the wireless audio output device may output a request signal to search for the portable device. If a response signal corresponding to the request signal is transmitted from the portable device, the wireless audio output device compares identification information included in the response signal with identification information of the portable device, which is pre-stored in the output device, to determine if the devices are connectable.

According to aspects of the present invention, the wireless audio output device may determine whether an audio file is received through any one of a plurality of external connection terminals, if the portable device is not detected.

According to aspects of the present invention, if an audio file is received through any one of the external connection terminals, the wireless audio output device may output the received audio file to speakers. Alternatively, if no audio file is received through any of the external connection terminals, the wireless audio output device may search for one of the external connection terminals, through which an audio file was most recently received, and then wait for an audio file to be received through the searched external connection terminal.

According to aspects of the present invention, the wireless audio output device may drive LEDs to emit alpha waves, when the audio file is outputted.

According to aspects of the present invention, the wireless audio output system may further comprise a remote controller to wirelessly control the wireless audio output device. If a command to control the audio file is transmitted from the remote controller, the wireless audio output device may deliver the audio file control command to the portable device, to control the output of the audio file.

According to aspects of the present invention, the wireless audio output device may determine whether an incoming call is made to the portable device, and if the incoming call is made, lower the volume of speakers, to notify the user of the incoming call.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE PREFERRED EMBODIMENTS

Figure 1:
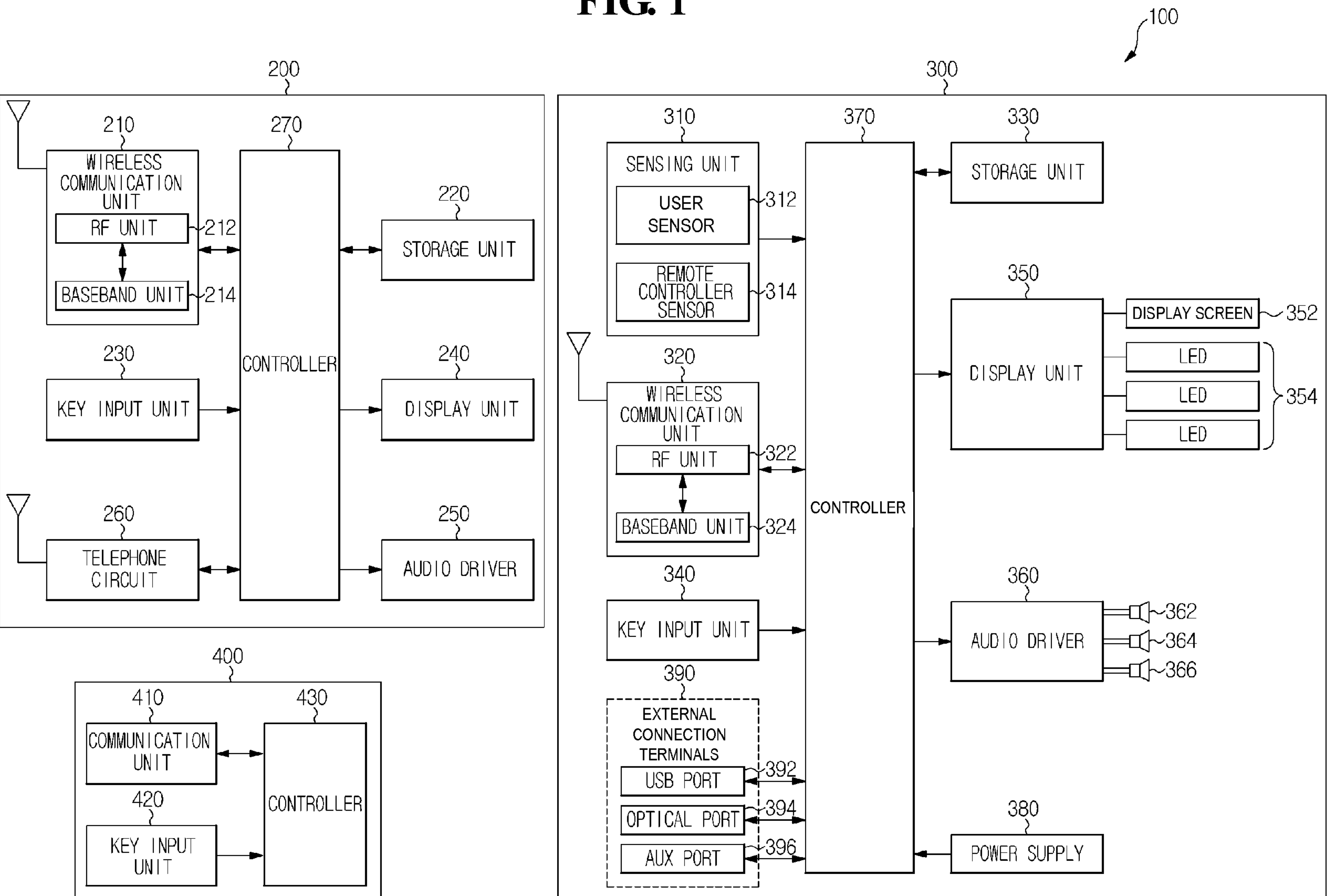
FIG. 1 is a block diagram of a wireless audio output system, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a block diagram of a wireless audio output system 100, according to an exemplary embodiment of the present invention. Referring to FIG. 1, the wireless audio output system 100 comprises a portable device 200, a wireless audio output device 300, and a remote controller 400.

The portable device 200 is capable of being carried by an individual and performing wireless communication. Examples of the portable device 200 include a notebook computer, an MP3 player, a mobile terminal (i.e., a mobile communication terminal), a personal communication system (PCS), a smart phone, a next-generation mobile communication terminal (IMT-2000), or a wireless local area network (LAN) terminal. In the present exemplary embodiment, the mobile terminal will be described as an example of the portable device 200. The mobile terminal 200 includes a wireless communication unit 210, a storage unit 220, a key input unit 230, a display unit 240, an audio driver 250, a telephone circuit 260, and a controller 270. However, it is understood that the portable device 200 can include other items instead of or in addition to the shown items, and that the portable device 200 need not include various elements, such as the circuit 260.

The wireless communication unit 210 can employ Bluetooth communication, Zigbee communication, Ultra Wide Band (UWB) communication, infrared communication, or the like. In the present exemplary embodiment, the Bluetooth communication will be described as an example. Bluetooth is a radio frequency (RF) standard for local-area, point to multipoint voice/data communication. Based on the Bluetooth communication, wireless transmission and reception can be carried out between the mobile terminal 200 and another communication device having a Bluetooth function, within a distance of about 10 cm to 10 m.

The wireless communication unit 210 includes an RF unit 212 and a baseband unit 214. The RF unit 212 performs the final transmission and reception of the Bluetooth communication, and the baseband unit 214 performs a baseband process for the Bluetooth communication. The baseband unit 214 modulates an original data signal into a signal of a desired frequency, such that the original data signal is transmitted on a Bluetooth communication frequency of, for example, 2.4 GHz.

The storage unit 220 stores a Bluetooth activation application, an MPEG Audio Layer-3 (MP3) application for music reproduction, a Digital Multimedia Broadcasting (DMB) application, etc., as well as other application programs. This storage unit 220 may broadly include a program area and a data area. The program area stores an operating system program to boot the mobile terminal 200, an application program for multimedia content reproduction, and various other application programs of the mobile terminal 200. For example, the application programs can include a camera function, a sound reproduction function, an image or video reproduction function, etc. When activating each of the aforementioned operations, in response to the user's request, the mobile terminal 200 performs each operation using a corresponding application program, under the control of the controller 270. The data area stores data based on the use of the mobile terminal 200. In particular, the data area stores an audio file based on the activation of an MP3 operation. While not required, the storage unit 220 can include removable media, such as a flash memory card, a USB drive, and/or optical recording/reproducing media. Further, the audio file need not be compressed in all aspects, and/or can be compressed according to other standards.

The key input unit 230 includes a plurality of input keys to input numeric or character information, and a plurality of function keys to activate various functions. The function keys include direction keys, side keys, hot keys, etc., which can be set to execute specific functions. The key input unit 230 delivers key signals, inputted in connection with the user's setting and the function control of the mobile terminal 200, to the controller 270.

The display unit 240 displays information inputted by the user, or information provided to the user, as well as various menus of the mobile terminal 200. In particular, the display unit 240 can display a connection state between the wireless communication unit 210 and the wireless audio output device 300. While not required, the display unit 240 and the key input unit 230 can be combined, such as in a touch screen display.

The audio driver 250 processes voice information for a telephone call or converts an audio file, based on the activation of the MP3 function, into an audio reproduction signal, to reproduce the audio file. The telephone circuit 260 enables voice transmission and reception for a telephone call with another party, via a wired/wireless communication network. That is, the telephone circuit 260 forms a communication channel linkage with a mobile communication base station and receives an incoming call signal (another party's voice) transmitted from the base station, via the formed communication channel, so that the user can converse with the party over the mobile terminal.

The controller 270 controls the entire operation of the mobile terminal 200 and a signal flow among internal blocks of the mobile terminal 200. In particular, when the wireless audio output device 300 outputs a request signal, to search for the Bluetooth connectable mobile terminal 200, the controller 270 receives the request signal, generates a response signal corresponding thereto, and sends the generated response signal back to the wireless audio output device 300, through the RF unit 212. The response signal includes identification information (a unique number) of the mobile terminal 200 and current operation information of the mobile terminal 200. When a control command for the reproduction of an audio file is delivered through the RF unit 212, the controller 270 performs a control operation, based on the control command, to fast forward, rewind, pause, or stop an audio file being reproduced by the mobile terminal 200.

The wireless audio output device 300 includes a sensing unit 310, a wireless communication unit 320, a storage unit 330, a key input unit 340, a display unit 350, an audio driver 360, a controller 370, and a power supply 380.

The sensing unit 310 includes a user sensor 312, and a remote controller sensor 314. The user sensor 312 detects when a user approaches. That is, the user sensor 312 senses the user by sensing infrared rays radiated from the body of the user. Alternatively, the user sensor 312 may include an ultrasonic sensor to sense the user's approach, by emitting ultrasonic waves and receiving the ultrasonic waves reflected from the body of the user, a heat sensor to sense a temperature variation caused by the user, or an audio detector to detect a sound of the user. The remote controller sensor 314 senses infrared rays emitted from the remote controller 400 and delivers control signals corresponding to the sensed infrared rays to the controller 370.

The wireless communication unit 320 is made up of an RF unit 322 and a baseband unit 324. The RF unit 322 performs the final transmission and reception of the Bluetooth communication, and the baseband unit 324 performs a baseband process for the Bluetooth communication. The baseband unit 324 modulates an original data signal into a signal of a desired frequency, such that the original data signal is transmitted on a Bluetooth communication band of 2.4 GHz, for example.

The storage unit 330 includes a read only memory (ROM), a random access memory (RAM), etc, and stores application programs to the control of the wireless audio output device 300, a Bluetooth activation application, a music reproduction application, etc. The storage unit 330 stores identification information (a unique number) of the mobile terminal 200, and information about dates and times at which audio files from a universal serial bus (USB), a digital versatile disc (DVD) device, etc., were received through external connection terminals 390. The external connection terminals 390 include a USB port 392, an optical port 394, and an AUX port 396, for example. The storage unit 330 stores information about amplitudes corresponding to respective genres of audio files. The storage unit 330 stores information about the positions of speakers 362, 364, and 366, based on the frequency bands of the audio files.

The key input unit 340 includes a plurality of function keys that are set to various functions. The function keys may include, for example, a power key to power on the wireless audio output device 300, and a volume key to raise or lower the volume of the speakers 362, 364, and 366. The key input unit 340 delivers key signals, inputted in connection with the function control of the wireless audio output device 300, to the controller 370.

The display unit 350 includes a display screen 352 to display information inputted by the user, or information provided to the user, as well as various menus of the wireless audio output device 300. The display unit 350 includes a plurality of light-emitting diodes (LEDs) 354. The LEDs 354 are used to emit alpha waves, when an audio file is outputted.

The audio driver 360 is connected with the three or more speakers 362, 364, and 366, to reproduce a three-dimensional stereo sound. While shown as only three speakers 362, 364, and 366, it is understood that fewer and/or additional numbers of speakers can be used. Moreover, the speakers 362, 364, and 366 can be external to the wireless audio output device 300, such as where the wireless audio output device 300 is a receiver. Stereo sound refers to an audio signal to which spatial information is added, so that the user can perceive a sense of direction and distance from music. The audio driver 360 converts stereo sound sources of left and right channels into a three channel, three-dimensional, stereo sound, using the positions of the speakers 362, 364, and 366 and a frequency band of an audio file stored in the storage unit 330. However, the stereo signal can be otherwise converted, such as to be compatible with 5.1 stereo surround sound, 7.1 stereo surround sound, or the like.

The controller 370 controls the entire operation of the wireless audio output device 300 and a signal flow among the internal blocks of the wireless audio output device 300. In particular, when the user is sensed by the user sensor 312, the controller 370 determines whether the mobile terminal 200 is detected, and performs a pairing with the mobile terminal 200, when the mobile terminal 200 is detected. That is, the controller 370 outputs a request signal to search for the mobile terminal 200, through the RF unit 322, receives a response signal corresponding to the request signal, and compares identification information in the received response signal with the identification information of the mobile terminal 200, which is stored in the storage unit 330. Then, when the identification information matches, the controller 370 determines that the mobile terminal 200 is connectable to the wireless audio output device 300 and pairs (connects) the mobile terminal 200 with the wireless audio output device 300.

On the other hand, when the connectable mobile terminal 200 is not detected, the controller 370 determines whether an audio file is received through the external connection terminals 390. When an audio file is received through one or more of the external connection terminals 390, the controller 370 delivers the received audio file to the audio driver 360 and controls the audio driver 360 to reproduce the received audio file.

When no audio file is received through the external connection terminals 390, the controller 370 determines which of the external connection terminals 390 most recently received an audio file, using the date and time information stored in the storage unit 330. The controller 370 connects the particular external connection terminal 390 with the audio driver 360, and waits for an audio file to be delivered to the audio driver 360, through the external connection terminal 390. For example, in the case where a port to which the latest audio file was inputted is the USB port 392, the controller 370 turns on a switch to connect the USB port 392 with the audio driver 360, so that an audio file can be delivered to the audio driver 360, through the USB port 392. At this time, the controller 370 turns off switches for the other ports 394 and 396, so that other audio files cannot be delivered to the audio driver 360 there through.

When an audio file is outputted, the controller 370 drives the LEDs 354, such that they emit alpha waves. The controller 370 changes the intensity of, or flickers, the LEDs 354, depending on the genre of the outputted audio file, using the audio file genre-based amplitude information stored in the storage unit 330. In this way the LEDs 354 can efficiently emit the alpha waves. However, it is understood that such LEDs 354 need not be used in all aspects.

When an incoming call is made to the mobile terminal 220, the controller 370 senses the incoming call and then lowers the volume of the speakers 362, 364, and 366. That is, when an incoming call is made to the mobile terminal 220, the controller 370 senses the incoming call through the RF unit 322 and then controls the audio driver 360 to lower the volume of the speakers 362, 364, and 366. While not required, the controller 370 can also mute the audio, and/or pause the audio, when the incoming call is made.

The power supply 380 supplies power to the wireless audio output device 300, so that the internal blocks of the wireless audio output device 300 can operate. The remote controller 400 wirelessly controls the wireless audio output device 300. The remote controller 400 includes a communication unit 410, a key input unit 420, and a controller 430.

The communication unit 410 performs infrared communication with the remote controller sensor 314. The key input unit 420 includes a plurality of input keys and delivers key signals to the controller 430. The controller 430 transmits audio file control commands to the remote controller sensor 314, through the communication unit 410, to fast forward, rewind, pause, or stop an audio file being reproduced by the mobile terminal 200. It is understood that the controller 400 need not be used in all aspects.

Figure 2:
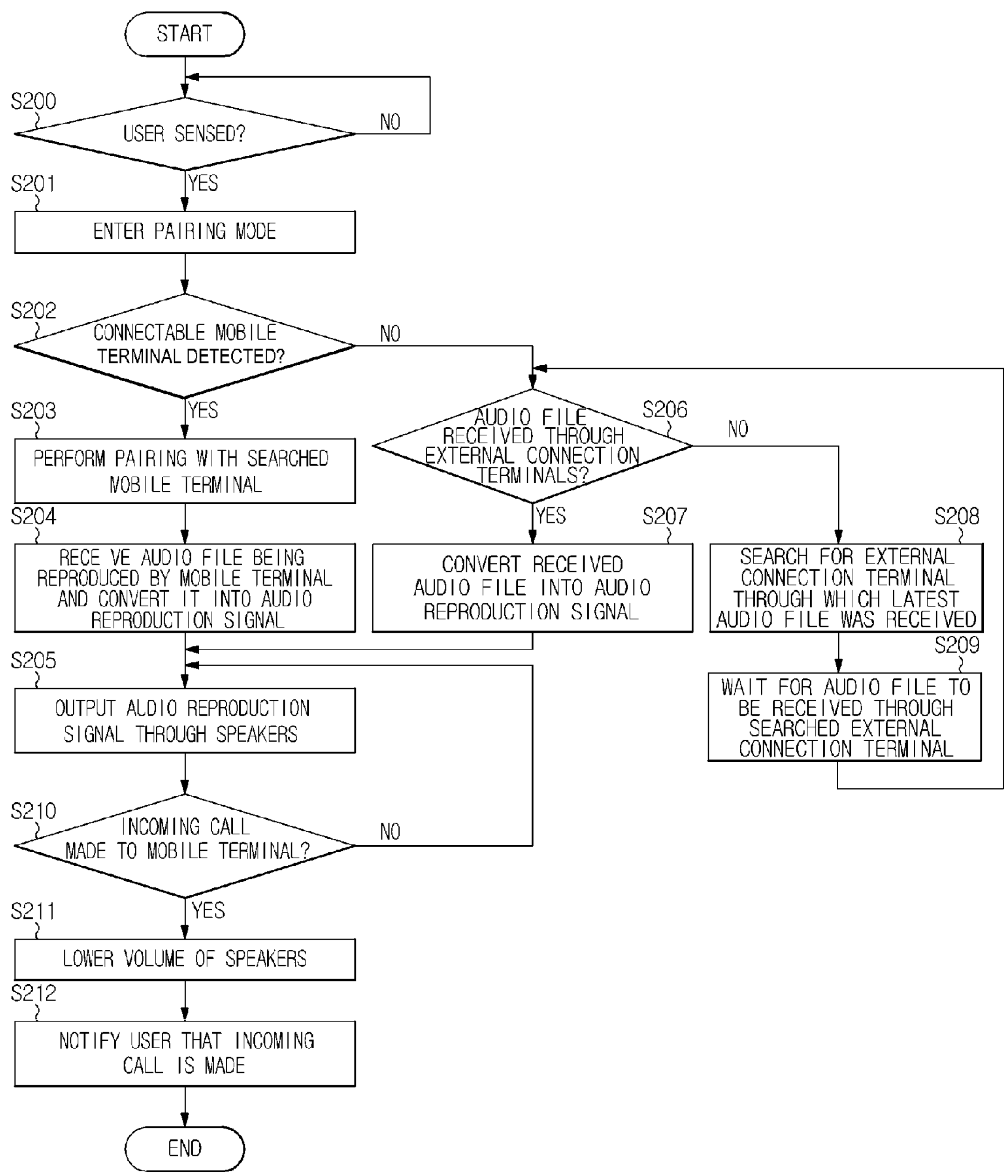
FIG. 2 is a flowchart illustrating a control process of a wireless audio output device, according to an exemplary embodiment of the present invention.

FIG. 2 is a flowchart illustrating a control process of the wireless audio output device 300, according to an exemplary embodiment of the present invention. As shown in FIG. 2, the wireless audio output device 300 is powered on, and then enters a standby mode when there is no input thereto, for a predetermined period of time.

Then, the wireless audio output device 300 determines whether the user is detected by the user sensor 312 (S200). If the user is sensed ('YES' at operation S200), the wireless audio output device 300 changes from the standby mode to an operating mode and then enters a pairing mode (S201).

Thereafter, the wireless audio output device 300 determines whether the connectable mobile terminal 200 is detected (S202). If the mobile terminal 200 is detected ('YES' at operation S202), the wireless audio output device 300 connects to the mobile terminal 200 (S203). In detail, the controller 370 outputs a request signal, to search for the mobile terminal 200 through the RF unit 322, receives a response signal corresponding to the request signal from the mobile terminal 200, and compares identification information in the received response signal with the identification information of the mobile terminal 200.

Then, when the identification information matches, the controller 370 determines that the mobile terminal 200 is connectable to the wireless audio output device 300 and pairs the wireless audio output device 300 and the mobile terminal 200. The automatic pairing between the mobile terminal 200 and the wireless audio output device 300 is preceded by a process of registering the identification information of the mobile terminal 200 in the storage unit 330.

Thereafter, the audio driver 360 receives, via Bluetooth, an audio file, from the mobile terminal 200, and converts the received audio file into a three-dimensional stereo signal (S204). In particular, the audio driver 360 converts left and right stereo channels into three channels of a three-dimensional stereo format, using speaker positions and a frequency band of the audio file, which is stored in the storage unit 330.

The audio driver 360 then outputs the converted audio reproduction signal through the three speakers 362, 364, and 366 (S205). When the connectable mobile terminal 200 is not detected in operation S202 ('NO' at operation S202), the controller 370 determines whether an audio file is received through one of the external connection terminals 390 (S206).

If an audio file is received through one of the external connection terminals 390 ('YES' at operation S206), the controller 370 converts the received audio file into a three-dimensional stereo signal, through the audio driver 360 (S207). Then, the audio driver 360 outputs the converted audio reproduction signal through the three speakers 362, 364, and 366 (S205).

If no audio file is received through the external connection terminals 390, at operation S206, the controller 370 detects which of the external connection terminals 390 most recently received an audio file, using the date and time information stored in the storage unit 330 (S208). The controller 370 connects the detected external connection terminal 390 with the audio driver 360, and waits for an audio file to be delivered through the external connection terminal 390 (S209).

The controller 370 determines whether an incoming call is made to the mobile terminal 220 (S21 0). Upon determining that the incoming call has been made to the mobile terminal 220, the controller 370 lowers the volume of the speakers 362, 364, and 366 (S211), to notify the user of the incoming call (S212).

In detail, if the incoming call is made to the mobile terminal 200, a notification signal is transmitted to the wireless communication unit 320, through the wireless communication unit 210. Then, the wireless communication unit 320 delivers the notification signal to the controller 370, to notify the controller 370 of the incoming call. Thus, the controller 370 outputs a control signal to the audio driver 360, such that the audio driver 360 lowers the volume of the speakers 362, 364, and 366.

In some cases, the user may manually output an audio file, being reproduced by the mobile terminal 200, to the wireless audio output device 300. For example, in the case where the wireless audio output device 300 is set to a manual mode, an audio file being reproduced by the mobile terminal 200 may be outputted to the wireless audio output device 300, according to the user's commands.

As is apparent from the above description, a wireless audio output device, a wireless audio output system including the same, and a control method thereof, according to aspects of the present invention, provide one or more of the following effects. When a user approaches the wireless audio output device, while listening to music on a portable device, the output device automatically pairs the portable device to the wireless audio output device, to reproduce the music of the portable device. Therefore, it is possible to remove the user's inconvenience resulting from having to manually connect the portable device to the wireless audio output device.

When an incoming call is made to the portable device, while the user listens to music of the portable device with the wireless audio output device, the output device automatically lowers the volume thereof, thereby more rapidly and efficiently notifying the user that the incoming call is received. The wireless audio output device provides the user with magnificent three-dimensional stereo sound, so that the user can feel as if he/she really listens to the music on a stage.

When the wireless audio output device reproduces music, it drives LEDs to emit alpha waves, thus giving comfort and stability to the user. In the case where there is no portable device connectable with the wireless audio output device, an external connection terminal, to which the most recent audio file was inputted, is connected with an audio driver, to wait for an audio file to be inputted. Therefore, the wireless audio output device can be more rapidly and efficiently driven, by receiving and reproducing an audio file through the external connection terminal. The portable device can be controlled using a remote controller that wirelessly controls the wireless audio output device. Therefore, it is possible to solve the user's trouble of having to personally operate the portable device.

While not required, it is understood that aspects of the present invention can be implemented using computer software encoded on one or more computer readable media, for use on one or more computers or processors.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A control method of a wireless audio output device, the control method comprising:

determining whether a user is detected within a proximity of the wireless audio output device;

searching for a portable device, only if the user is detected;

outputting an audio file being reproduced by the portable device, to be played through one or more speakers, if the portable device is detected by the searching;

determining whether an incoming call is made to the portable device; and if the incoming call is made to the portable device, lowering a volume of the speakers.

2. The control method according to claim 1, wherein the searching comprises:

sending a request signal to search for the portable device; and if a response signal corresponding to the sent request signal is transmitted from the portable device, comparing identification information included in the response signal with identification information of the portable device, which is stored in the wireless audio output device.

3. The control method according to claim 1, further comprising determining whether an audio file is received through any one of a plurality of external connection terminals, if the portable device is not detected.

4. The control method according to claim 3, further comprising, if no audio file is received through any of the external connection terminals, determining which particular one of the external connection terminals most recently received an audio file, and waiting for an audio file to be received through the particular external connection terminal.

5. The control method according to claim 3, further comprising, if an audio file is received through one of the external connection terminals, outputting the received audio file to be played through the speakers.

6. The control method according to claim 1, further comprising driving one or more emitters to emit rhythmic sensory stimulation in a range of alpha wave brainwaves, when the audio file is outputted.

7. The control method according to claim 6, further comprising controlling an intensity of the emitters to flicker in accordance with amplitude information of a genre of the outputted audio file, wherein the emitters comprise Light Emitting Diodes (LEDs).

8. The control method according to claim 1, further comprising, if an audio file control command is transmitted from a remote controller, delivering the audio file control command to the portable device, to control the output of the audio file.

9. The control method according to claim 8, wherein the controlling the output of the audio file comprises pausing, stopping, fast forwarding, or rewinding the audio file.

10. A wireless audio output device comprising:

one or more speakers;

a user sensor to sense a proximity of a user;

a wireless communication unit to search for a portable device, only if the user is sensed;

a controller to control an output of an audio file being reproduced by the portable device, to be played through the one or more speakers, if the portable device is detected by the search; and a telephone circuit to receive an incoming call signal from a mobile communication base station, wherein if the incoming call signal is received from the mobile communication base station, the controller lowers a volume of the speakers.

11. The wireless audio output device according to claim 10, wherein:

the controller outputs a request signal to detect the portable device; and if a response signal corresponding to the request signal is transmitted from the portable device, the controller compares identification information included in the response signal with identification information of the portable device, which is pre-stored in the wireless audio output device, to determine whether the portable device is connectable to the wireless communication unit.

12. The wireless audio output device according to claim 10, wherein the controller determines whether an audio file is received through any one of a plurality of external connection terminals, if the portable device is not detected by the search.

13. The wireless audio output device according to claim 12, wherein:

if no audio file is received through any of the external connection terminals, the controller determines which particular one of the external connection terminals most recently received an audio file; and then the controller waits for an audio file to be received through the particular external connection terminal.

14. The wireless audio output device according to claim 12, wherein if an audio file is received through any one of the external connection terminals, the controller controls the output of the received audio file through the speakers.

15. The wireless audio output device according to claim 10, further comprising one or more emitters, wherein the controller drives the emitters to emit rhythmic sensory stimulation in a range of alpha wave brainwaves, when the audio file is outputted to be played through the speakers.

16. The wireless audio output device according to claim 15, wherein:

the controller controls an intensity of the emitters to flicker in accordance with amplitude information of a genre of the outputted audio file, and the emitters comprise Light Emitting Diodes (LEDs).

* * * * *